(12) United States Patent
Wang et al.

(10) Patent No.: US 10,346,034 B2
(45) Date of Patent: Jul. 9, 2019

(54) DYNAMICALLY GENERATING CHARACTERS WITH PERSONALIZED HANDWRITING CHARACTER FONT CHARACTERISTICS METHOD AND SYSTEM THEREOF

(71) Applicant: DynaComware Taiwan Inc., Taipei (TW)

(72) Inventors: Fu-Jen Wang, Taipei (TW); Ji-Ming Chen, Taipei (TW); Ann Lee, Taipei (TW)

(73) Assignee: DynaComware Taiwan Inc., Taipei (TW)

(*) Notice: Subject to any disclaimer, the term of this patent is extended or adjusted under 35 U.S.C. 154(b) by 64 days.

(21) Appl. No.: 15/263,386

(22) Filed: Sep. 13, 2016

(65) Prior Publication Data

US 2017/0109034 A1 Apr. 20, 2017

Related U.S. Application Data

(60) Provisional application No. 62/243,152, filed on Oct. 19, 2015.

(30) Foreign Application Priority Data

Jun. 3, 2016 (TW) .............................. 105117613 A (51) Int. Cl.
*G06F 3/00* (2006.01)
*G06F 3/0488* (2013.01)
(Continued)

(52) U.S. Cl.
CPC ........ *G06F 3/04883* (2013.01); *G06F 17/214* (2013.01); *G06F 3/0416* (2013.01)

(58) Field of Classification Search
CPC ............ G06F 17/214; G06F 17/04883; G06F 17/0416
See application file for complete search history.

(56) References Cited

U.S. PATENT DOCUMENTS 5,212,769 A * 5/1993 Pong ....................... G06F 3/018
345/467
6,298,154 B1 * 10/2001 Cok ....................... G06K 9/222
345/467
(Continued)

FOREIGN PATENT DOCUMENTS

CN 1024050 C 3/1994
CN 101893995 A 11/2010
(Continued)

*Primary Examiner* — Kyle R Stork
(74) *Attorney, Agent, or Firm* — CKC & Partners Co., LLC (57) ABSTRACT

A method for dynamically generating a personalized handwriting character font includes inputting a plurality of handwriting sequentially through an input interface. Each handwriting describes a character. Then, the positions of strokes of characters in the input interface described by the plurality of handwriting are identified. Next, font characteristics of the characters are determined according to the positions of strokes in the input interface. A personalized handwriting character font characteristic is determined according to the font characteristics. Finally, a new character font file with a personalized handwriting character font is generated according to the personalized handwriting character font characteristic.

8 Claims, 4 Drawing Sheets

(51) Int. Cl.
    *G06F 17/21*     (2006.01)
    *G06F 3/041*     (2006.01)

(56) References Cited

U.S. PATENT DOCUMENTS

| | | | |
|---|---|---|---|
| 2007/0097124 A1* | 5/2007 | Chang | G06F 3/018 345/467 |
| 2013/0215045 A1 | 8/2013 | Chen | |
| 2016/0078656 A1* | 3/2016 | Borson | G06F 17/214 345/472 |
| 2016/0379048 A1* | 12/2016 | Kumar | G06T 11/60 382/159 |

FOREIGN PATENT DOCUMENTS

| | | |
|---|---|---|
| CN | 103914503 A | 7/2014 |
| CN | 104200247 A | 12/2014 |
| CN | 104598148 A | 5/2015 |
| JP | 10-333663 A | 12/1998 |
| JP | 2000-330546 A | 11/2000 |
| JP | 2003-233825 A | 8/2003 |
| TW | 358913 | 5/1999 |
| TW | 434493 B | 5/2001 |
| TW | 486642 B | 5/2002 |
| TW | I231457 B | 4/2005 |
| TW | 200811727 A | 3/2008 |
| TW | 200947309 A | 11/2009 |
| TW | 201426512 A | 7/2014 |

\* cited by examiner

DYNAMICALLY GENERATING CHARACTERS WITH PERSONALIZED HANDWRITING CHARACTER FONT CHARACTERISTICS METHOD AND SYSTEM THEREOF

This application claims priority to Taiwanese Application Serial Number 105117613, filed Jun. 3, 2016, and U.S. Provisional Application Ser. No. 62/243,152, field Oct. 19, 2015, which is herein incorporated by reference.

BACKGROUND

Field of Invention

The present invention relates to a system and method for generating characters. More particularly, the present invention relates to a system and method for dynamically generating characters fonts with personalized handwriting characteristics.

Description of Related Art

For the standard encoding in the Asian countries, there are 13,053 characters in the Big5 specification used by Taiwan, and 6,763 characters in the GB2312 specification as well as 27,533 characters in the GB18030 specification both used by China. Although Hong Kong uses the Big5 specification, Hong Kong applies an added character set to include additional 5,009 characters. The JISx0213 specification used by Japan includes 11,233 characters. The number of characters keeps increasing for the Unicode specification of collecting the worldwide characters. The Unicode 8.0 currently includes 120,737 characters.

Expectedly, the number of characters used by people will continue to increase. In order to use these characters in any digital system, these characters must be produced and installed into a set of well-defined character code, known as a codebook.

Typically, it takes years of lengthy time to complete all the characters in a codebook. Therefore, a stroke constituting method and a basic component (radical) constituting method are provided to shorten the time to complete a set of codebook. In these methods, only a few strokes or radicals are needed to form the characters in a codebook to improve the speed of producing the characters. However, both of the stroke constituting method and the basic component (radical) constituting method can only be used to produce the standard character font, such as the Ming Hei, Yuan, and Kai font and so on. The stroke constituting method and the basic component (radical) constituting method cannot be used to produce personalized handwriting characters that do not have fixed rules for the handwriting and strokes.

Accordingly, facing the increasing demand of personalized handwriting character font, there is a need for better method and system to allow users to easily generate a personalized handwriting character font.

SUMMARY

The present disclosure provides a method for dynamically generating a personalized handwriting character font. The method comprises inputting sequentially a plurality of handwriting through an input interface, wherein each of the handwriting describes a character. Then, the positions of strokes of characters in the input interface described by the plurality of handwriting are identified. Next, font characteristics of the characters are determined respectively according to the positions of strokes in the input interface. The font characteristics comprise of lengths of strokes, angles between the strokes, spacing distances between strokes, cross positions between strokes and connection positions between strokes. A personalized handwriting character font characteristic is determined according to the font characteristics. Finally, a new character font file with a personalized handwriting character font is generated according to the personalized handwriting character font characteristic.

In an embodiment, the step of generating a new character font file according to the personalized handwriting character font characteristic further comprises to input a handwriting character in the input interface, to generate the handwriting character according to the personalized handwriting character font characteristic, and to use the generated handwriting character to form the new character font file.

In an embodiment, the step of generating a new character font file according to the personalized handwriting character font characteristic further comprises to adjust characters of a preexisting character font according to the personalized handwriting character font characteristic, and to use the adjusted characters to form the new character font file.

In an embodiment, the step of generating a new character font file according to the personalized handwriting character font characteristic further comprises to define at least one stroke of the characters as a basic component, to use the basic component to form the at least one stroke of the input character when an input character has the at least one stroke, and to use the input character to form the new character font file.

In an embodiment, the method further comprises to install the new character font file in a Web Service API, and to define the personalized handwriting character font in an Internet interface.

The present disclosure also provides a system for dynamically generating a personalized handwriting character font. The system comprises an input interface, an identification unit, a parsing unit, and an adjusting unit. The input interface receives a plurality of handwriting sequentially. Each of the handwriting describes a character. The identification unit identifies positions of strokes of characters in the input interface described by the plurality of handwriting. The parsing unit analyzes font characteristics of the characters respectively according to the positions of strokes in the input interface. The font characteristics comprise lengths of strokes, angles between the strokes, spacing distances between strokes, cross positions between strokes and connection positions between strokes, and determining a personalized handwriting character font characteristic according to the font characteristics. The adjusting unit generates a new character font file with a personalized character font according to the personalized handwriting character font characteristic.

In an embodiment, the input interface is a magnetic type, a capacitive type or a resistive type touch sensitive panel.

In an embodiment, the system further comprises a memory to store the personalized handwriting character font characteristic.

In an embodiment, the input interface and the identification unit are disposed in a handheld device, and the parsing unit and the adjusting unit are disposed on a remote server.

In an embodiment, the adjusting unit that generates a new character font file with a personalized character font according to the personalized handwriting character font characteristic is further configured to use the input interface to receive a handwriting character in the input interface, and to use the adjusting unit to generate the handwriting character according to the personalized handwriting character font characteristic, and the generated handwriting character is used to form the new character font file.

In an embodiment, the adjusting unit that generates a new character font file with a personalized character font according to the personalized handwriting character font characteristic is further configured to use the adjusting unit to adjust characters of a preexisting character font according to the personalized handwriting character font characteristic, and the adjusted characters are used to form the new character font file.

In an embodiment, the adjusting unit that generates a new character font file with a personalized character font according to the personalized handwriting character font characteristic is further configured to use the parsing unit to define at least one stroke of the characters as a basic component, and to use the adjusting unit to use the basic component to form the at least one stroke of the input character, and the formed input character is used as a character of the new character font file when an input character has the at least one stroke.

In conclusion, according to the system and method of the present disclosure, each user can edit your personalized handwriting character font through a handheld device, and display the character with the personalized handwriting character font characteristics on the web page to show his/her uniqueness.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

In order to make the description of the disclosure more detailed and comprehensive, reference will now be made in detail to the accompanying drawings and the following embodiments. However, the provided embodiments are not used to limit the ranges covered by the present disclosure. Moreover, the order of any steps described is not used to limit the execution sequence thereof. Any device capable of achieving an equivalent effect through rearrangement is also covered by the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise.

Figure 1A:
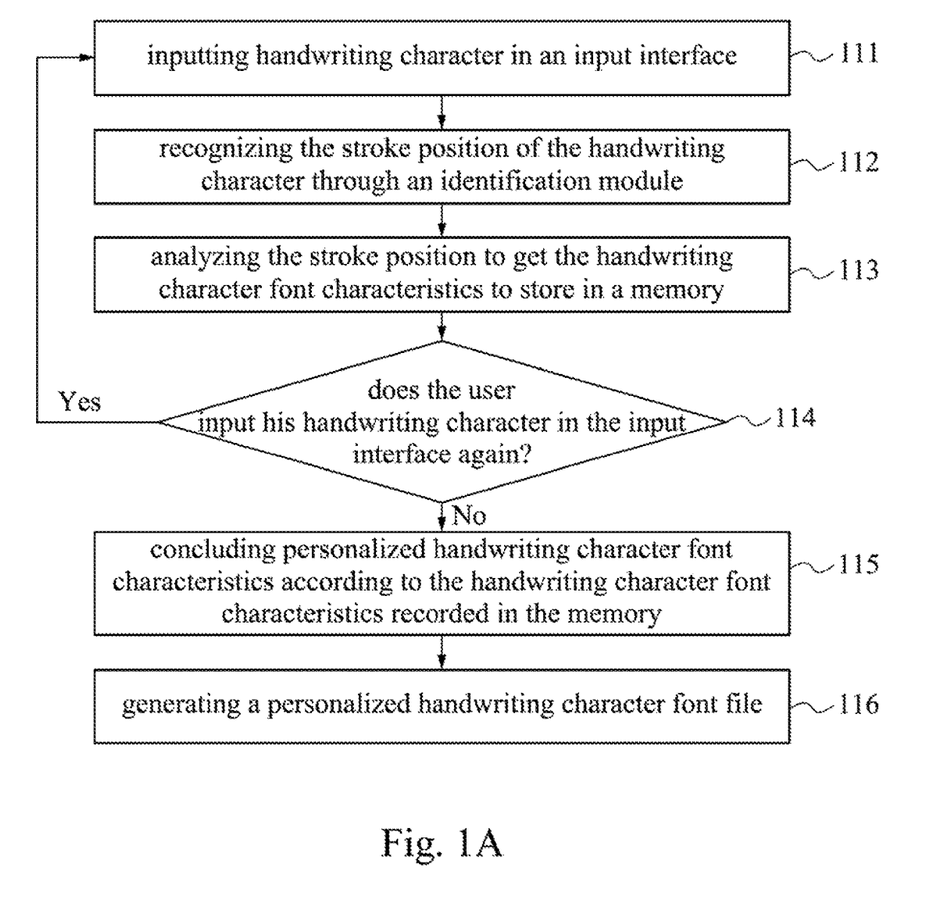
FIG. 1A illustrates a flow chart of a method for analyzing handwriting character font characteristics according to an embodiment of the present invention.
Figure 1B:
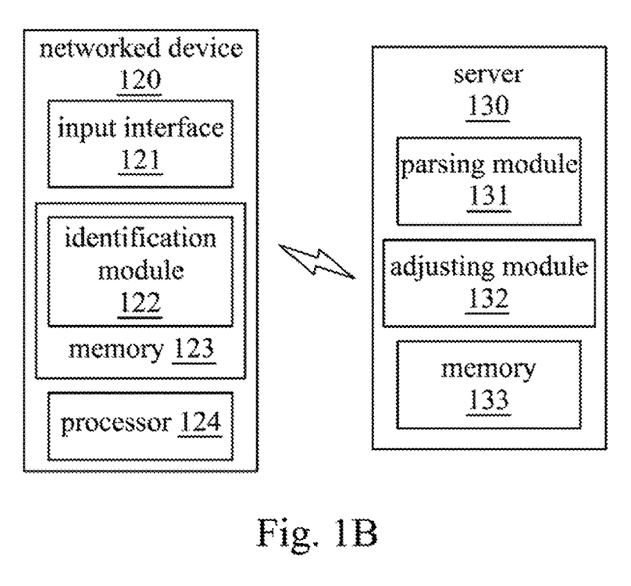
FIG. 1B illustrates a schematic diagram of a system for analyzing a handwriting character font characteristic according to an embodiment of the present invention.

FIG. 1A illustrates a flow chart of a method for analyzing handwriting character font characteristics according to an embodiment of the present invention. FIG. 1B illustrates a schematic diagram of a system for analyzing a handwriting character font characteristic according to an embodiment of the present invention. The method for analyzing a handwriting character font characteristic can be implemented as a computer program product (such as applications) recorded in a readable storage media, such as the read-only memory, the flash memory, the floppy disk, the hard disk, the CD, the flash drives, the magnetic tape, the database accessed by the network, or the storage media having the same functions that one person skilled in the art can easily think. Accordingly, the computer system may read the readable storage media to perform the method for analyzing the handwriting character font characteristics.

Figure 2:
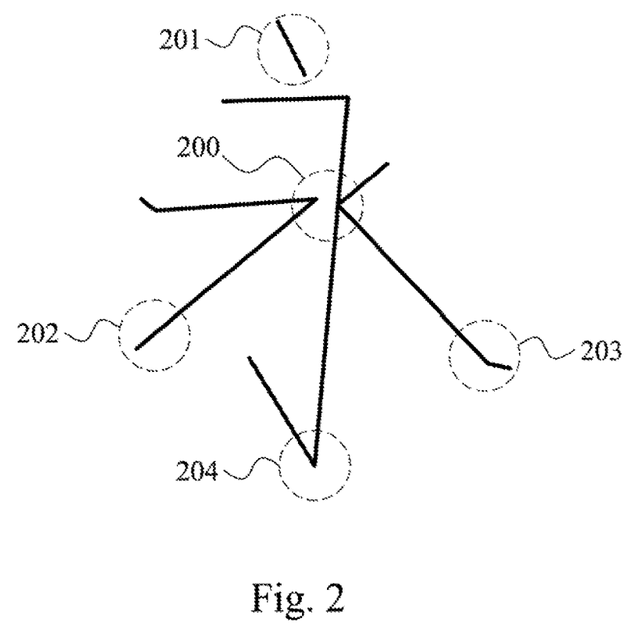
FIG. 2 illustrates a handwriting character of "永" inputted by a user in the input interface.

For convenience of explanation, please also refer to FIG. 1A and FIG. 1B. First, as shown in step 111, a user inputs his handwriting character in an input interface 121. The handwriting character describes at least one character. Then, as shown in step 112, an identification module 122 is used to recognize the stroke position of the handwriting character. In one embodiment, the input interface 121 is a magnetic type, a capacitive type or a resistive type touch sensitive panel. The user can input his handwriting through a stylus or a finger of the user. The movement track and the corresponding positions of the handwriting character in the input interface 121 can be gathered by the identification module 122 and be recorded to form an electromagnetic record. The electromagnetic record records the corresponding position of each stroke, the length of each stroke, and the angle between the strokes of the handwriting character in the input interface 121. However, the present invention is not limited thereto. In one embodiment, if the input interface 121 includes a force sensor, the identification module 122 further gathers the sensing value sensed by the force sensor. The value represents the force applied to input the handwriting character. FIG. 2 illustrates a handwriting character of "永" inputted by a user in the input interface 121. In this case, the identification module 122 gathers the movement track and the corresponding positions of the handwriting character of "永" on the input interface 121. The movement track and the corresponding positions are recorded to form an electromagnetic record. In one embodiment, the input interface 121 and the identification module 122 may be disposed on a networked device 120, for example, on a handheld device. The identification module 122 may be implemented by a software mode or a hardware circuit. If the identification module 122 is a recognition software, this identification module 122 can be stored in the memory 123. Then, the processor 124 of the networked devices 120 may perform the identification module 122 in the memory 123 to identify the movement track and the corresponding positions of the handwriting character in the input interface 121 to form an electromagnetic record. Then, the networked device 124 transfers the electromagnetic records through the wireless transmission or the wired transmission system to the remote server 130 for subsequent analysis and processing.

Next, in step 113, according to the electromagnetic records, the stroke positions of the user handwriting character is analyzed to get the handwriting character font characteristics. In one embodiment, when the remote server 130 receives the electromagnetic records from the networked device 120. The parsing module 131 in the remote server 130 resolves the electromagnetic records to retrieve the position of each stroke of the handwriting character on the input interface 121 for analyzing the handwriting character font characteristics, including strokes spacing, cross or connection location and the length of stroke and so on. For example, if the user inputs a handwriting character of "永" as illustrated in FIG. 2, the parsing module 131 may obtain the positions of the strokes constituting the character of "永" in the input interface 121 by parsing the electromagnetic records. By analyzing the positions of strokes of the character of "永" in the input interface 121, the position relationship of strokes (basic components) may be got. Then, the length of each stroke, the angle between the strokes, the spacing between strokes, the cross position between strokes, the connection positions between strokes and so on are also got. The parsing module 131 may define at least one stroke composed of the character of "永" as a basic component for subsequent application, which will be explained in the subsequent paragraphs. Accordingly, the font characteristic of the spacing between strokes in region 200, the font characteristic of the inclination angle of the stroke in region 201, the font characteristic of the inclination angle of the stroke end in region 202, the font characteristic of the inclination angle of the stroke end in region 203, and the characteristic of the uppercut angle of the stroke in region 204 of the character of "永" in FIG. 2 may be obtained. However, the present invention is not limited thereto. Other handwriting character font characteristics may also be retrieved according to the user needs. The handwriting character font characteristics are recorded in the memory 133. In one embodiment, the parsing module 131 is an application program stored in the memory 133. A processor (not shown in this Figure) in the remote server 130 performs the parsing module 131 to analyze the input handwriting character font characteristics.

In step 114, a determination step is performed to determine whether or not the user input handwriting character in the input interface 121 again. If the user inputs handwriting character again, the steps 111-113 are performed again to gather the handwriting character font characteristics and store the handwriting character font characteristics in the memory 133. In contrast, if the user does not input handwriting character again, the step 115 is performed to conclude personalized handwriting character font characteristics according to the handwriting character font characteristics recorded in the memory 133. For example, in an embodiment, the inclination angles of the strokes stored in the memory 133 are averaged to be as the personalized handwriting character font characteristic of inclination angle. Accordingly, when the user writes an inclined stoke, the personalized handwriting character font characteristic of inclination angle is used to form the inclination angle of this stroke. In other embodiment, the spacing distances between strokes stored in the memory 133 are averaged to be as the personalized handwriting character font characteristic of spacing distance. Accordingly, when the user writes two stokes, the personalized handwriting character font characteristic of spacing distance is used to space the two strokes. In another embodiment, the uppercut angles of the stroke ends stored in the memory 133 are relative to be as the personalized handwriting character font characteristic of uppercut angle. Accordingly, when the user writes a stroke with an uppercut end, the personalized handwriting character font characteristic of uppercut angle is used to form the uppercut end of this stroke. Therefore, upon obtaining these personalized handwriting character font characteristics, the adjustment module 132 may adjust the input handwriting according to these personalized handwriting character font characteristics during the subsequent application, so that the final representing word will have these personalized handwriting character font characteristics. In another embodiment, the adjustment module 132 may adjust the all words of the preexisting handwriting character font according to these personalized handwriting character font characteristics. For example, the adjustment module 132 may adjust the inclination angle of a stroke and the spacing distance between two strokes of the words according to these personalized handwriting character font characteristics. Finally, in step 116, a new handwriting character font file in which the characters have these personalized handwriting character font characteristics is generated. Accordingly, when a character is inputted by the user, the new handwriting character font file is used to generate this character. In an embodiment, the adjustment module 132 is an application program stored in a memory 133. The microprocessor (not shown) of the remote server 130 performs this adjustment module 132 to adjust the inputted characters according to these personalized handwriting character font characteristics.

Figure 3:
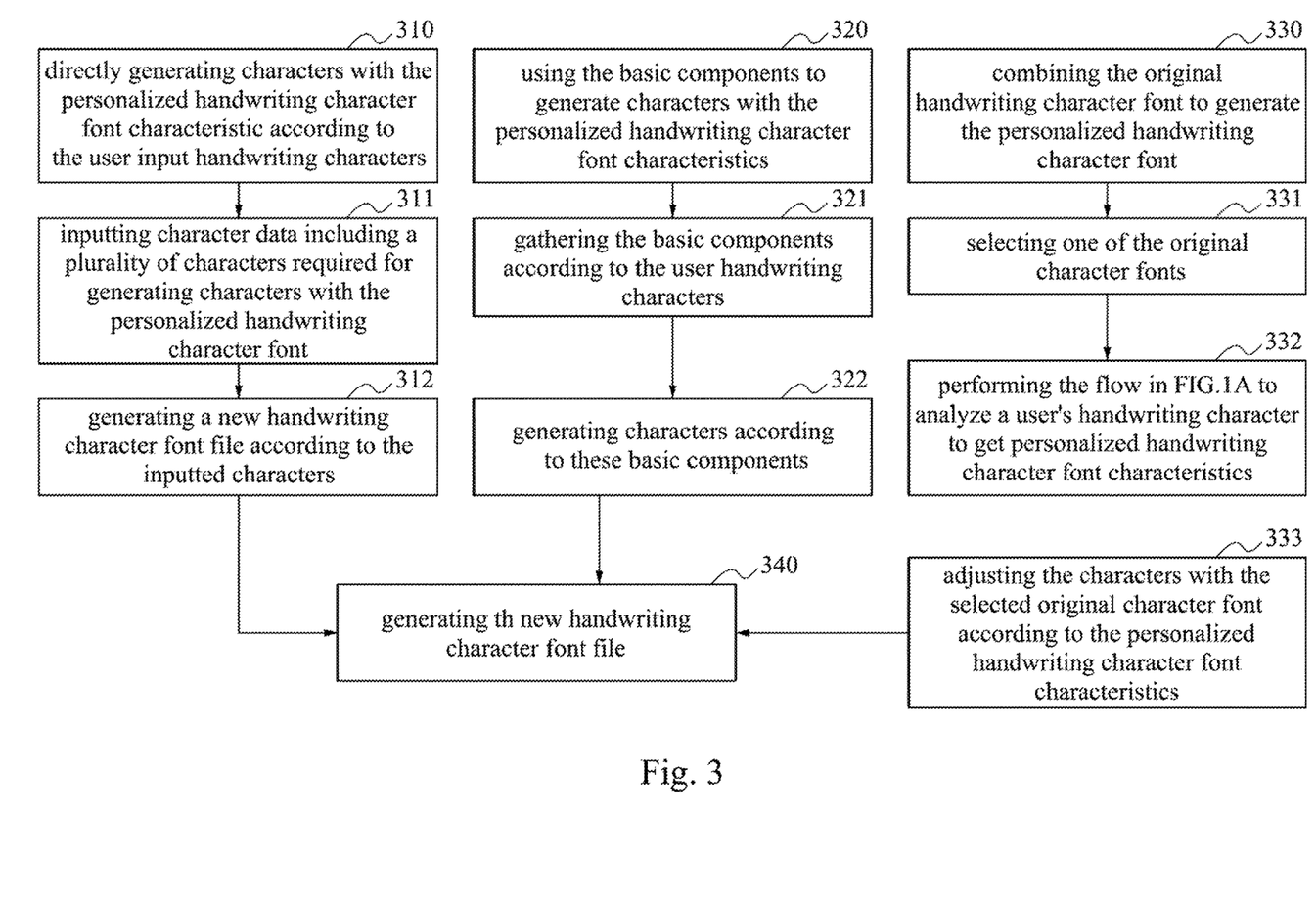
FIG. 3 illustrates a method to dynamically generate a character with the personalized handwriting character font characteristic according to an embodiment of the invention.

FIG. 3 illustrates a method to dynamically generate a character with the personalized handwriting character font characteristic according to an embodiment of the invention. The present invention provides three methods to generate a character with the personalized handwriting character font characteristic for a user to select. The first method is the step 310 that can directly generate characters with the personalized handwriting character font characteristic according to the user handwriting character. The second method is the step 320 that uses the basic components to generate a character with the personalized handwriting character font characteristic. The third method is the step 330 that combines the personalized handwriting character font with the preexisting font to generate the personalized handwriting character font.

The step 310 directly generates characters with the personalized handwriting character font characteristic according to the user input handwriting characters. Therefore, in step 311, a character data including a plurality of characters required for generating characters with the personalized handwriting character font is inputted through the input interface 121. In an embodiment, the characters are sequentially inputted through the input interface 121 according to the arrangement of the character code. Then, the characters are transferred to the remote server 130 to store in the memory 133. In step 312, a new handwriting character font file including the characters is generated according to the inputted characters. In step 313, the new handwriting character font file is stored in the memory 133 in the remote server 130 to serve as a new character font file. Then, in step 340, the new handwriting character font file is generated. Accordingly, when the user inputs a character, a corresponding character in the new handwriting character font file is gathered to be the personalized character and shown in the display.

The step 320 is to use the basic components to generate characters with the personalized handwriting character font characteristic. In an embodiment, a Chinese character is usually composed of basic components. For example, the character "仙" composed of the two basic components of "亻" and "山". Moreover, the two basic components of "亻" and "山" are also widely used in other characters. For example, both the characters of "你" and "他" use the basic component of "亻". The character of "岩" use the basic component of "山", Therefore, when the user inputs the character "仙" in the input interface 121, the two basic components of "亻" and "山" is stored in the memory 133 of the remote server 130. Accordingly, when a user inputs a subsequent character that includes the two basic components of "亻" and "山" the server 130 may retrieve the two basic components of "亻" and "山" stored in the memory 133 to replace the two basic components of "亻" and "山" in the subsequent character. Accordingly, the character with the replaced basic components will have the personalized handwriting character font characteristics. Therefore, according to this method, in step 321, the user needs to input sufficient required characters for gathering the basic components to generate different characters. The user may determine the number and the type of the requiring characters according to his needed. Typically, the more the required characters are inputted, the more the basic components are gathered. These gathered basic components are stored in the memory 133 in the remote server 130. Then, in step 322, a character is generated according to these basic components. That is, when a user inputs a subsequent character that includes basic components, the basic components stored in the memory 133 are used to compose the subsequent characters, so that the subsequent characters will have the personalized handwriting character font characteristic. The characters having the personalized handwriting character font characteristic compose a new character font file. Then, in step 340, the new character font file is generated. It is noticed that the step 321 further comprises performing the flow chart in FIG. 1A for analyzing a handwriting to get at least one stroke of the inputted character to serve as a basic component. At this time, the personalized handwriting character font characteristics are generated according to the length of each stroke, the angle between the strokes, the spacing between strokes, the cross position between strokes and the connection positions between strokes. Then, the basic components are adjusted according to the personalized handwriting character font characteristics.

The step 330 combines a preexisting character font set to generate the personalized handwriting character font. This step may analyze the handwriting character to generate personalized handwriting character font characteristics. Then, the characters in the preexisting character font set are adjusted, such as to adjust the inclination angle of the stroke or to adjust the spacing distance between two strokes, according to the personalized handwriting character font characteristics to make the characters have the personalized handwriting font characteristics. Accordingly, according to this method, in step 331, the user needs to select a preexisting character font. In an embodiment, the user may select one of the preexisting character fonts, such as to select the Ming font or the Hei font. Next, the characters with the selected preexisting character font are adjusted according to the personalized handwriting character font characteristics to snake the characters have the selected preexisting character font combining the personalized handwriting font characteristics. Accordingly, in step 322, the flow chart in FIG. 1A is performed to analyze a user's handwriting to get personalized handwriting character font characteristics. In this step, the length of each stroke, the angle between the strokes, the spacing between strokes, the cross position between strokes and the connection positions between strokes are analyzed to get handwriting character font characteristics and these characteristics are store in the memory 133 in the remote server 130. After all characters are analyzed, the personalized handwriting character font characteristics are generated according to the handwriting character font characteristics recorded in the memory 133. Then, in step 333, the characters with the selected preexisting character font are adjusted according to the personalized handwriting character font characteristics to make the characters with the selected preexisting character font combining the personalized handwriting font characteristics. Then, the characters having the selected preexisting character font combining the personalized handwriting font characteristics compose a new character font file. Then, in step 340, this new character font file is generated.

Figure 4:
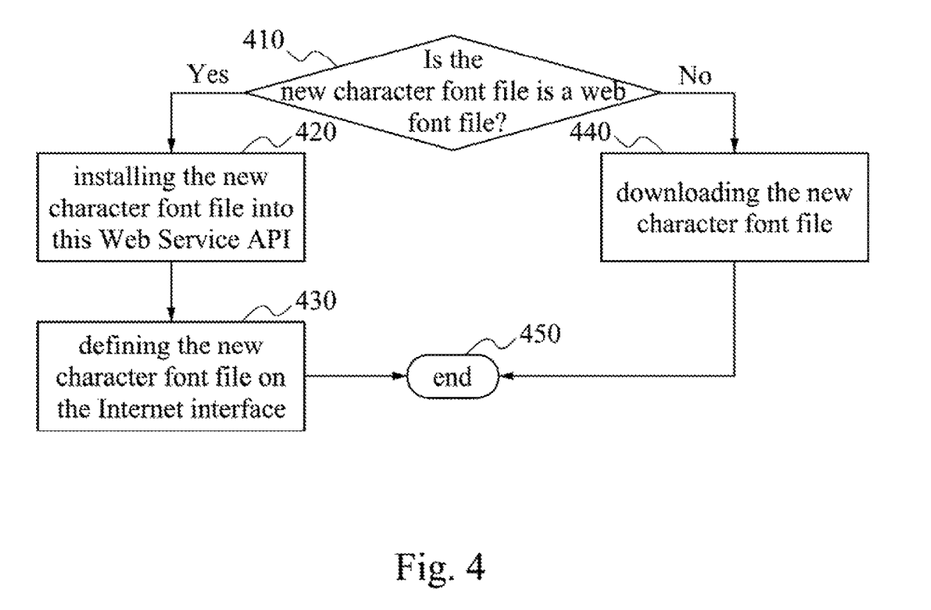
FIG. 4 illustrates a flow chart to apply the new character font file in the Internet in accordance with an embodiment of the present invention.

After the new character font file is generated, the new character font file may be carried out through the Internet. FIG. 4 illustrates a flow chart to apply the new character font file in the Internet in accordance with an embodiment of the present invention. In this process 400, first in step 410, a determination step is performed to determine whether or not the new character font file is a web font file. If the new character font file is a web font file, in step 420, the new character font file is installed into this Web Service API. Then, in step 430, the new character font file with the personalized character font is defined on the Internet interface. In contrast, if the new character font file is not a web font file, in step 440, the new character font file must be downloaded for the subsequent application. Then, in step 450, this process is ended. Accordingly, no matter whether the platform installs the character font file or not, the new characters with the personalized handwriting character font characteristics may be shown in the web page or mobile applications to represent the personalized characteristic.

In summary, by the system and method of the present invention, each user can edit their personalized handwriting character font through a handheld device, and display the character with the personalized handwriting character font characteristics on the web page to show his/her uniqueness.

Even though the present disclosure is disclosed as above, the disclosure is not used to limit the present disclosure. It will be apparent to those skilled in the art that various modifications and variations can be made to the present disclosure without departing from the spirit or scope of the invention; thus, it is intended that the range protected by the present disclosure should refer to the scope of the following claims.

What is claimed is:

1. A method for dynamically generating a personalized handwriting character font, the method comprising:
    receiving a plurality of handwriting sequentially from a user through an input interface, wherein each of the handwriting describes a training character;
    identifying positions of strokes of training characters in the input interface described by the plurality of handwriting;
    determining font characteristics of the training characters respectively according to the positions of strokes in the input interface, wherein the font characteristics comprise lengths of strokes, angles between the strokes, spacing distances between strokes, cross positions between strokes and connection positions between strokes;
    determining a personalized handwriting character font characteristic according to the font characteristics of the training characters, further comprising:
        averaging the lengths of strokes to get an averaged stroke length, averaging the angles between the strokes to get an averaged angle between the strokes, averaging the spacing distances between strokes to get an averaged spacing distance between strokes, averaging the cross positions between strokes to get an averaged cross position between strokes and averaging the connection positions between strokes to get an averaged connection position between strokes; and gathering the averaged stroke length, the averaged angle between the strokes, the averaged spacing distance between strokes, the averaged cross position between strokes and the averaged connection position between strokes to serve as the personalized handwriting character font characteristic of the user; and generating a new handwriting character with a personalized handwriting character font according to the personalized handwriting character font characteristic, further comprises:

inputting a handwriting character in the input interface, wherein the handwriting character includes a plurality of handwriting strokes;

modifying the handwriting strokes only according to the personalized handwriting character font characteristic, wherein the averaged stroke length, the averaged angle between the strokes, the averaged spacing distance between strokes, the averaged cross position between strokes and the averaged connection position between strokes are used to modify lengths of the handwriting strokes, angles between the handwriting strokes, spacing distances between the handwriting strokes, cross positions between the handwriting strokes and connection positions between the handwriting strokes; and forming the new handwriting character according to the modified character.

2. The method of claim 1, further comprising:
defining at least one stroke of the characters as a basic component; and
when an input character has the at least one stroke, using the basic component to form the at least one stroke of the input character.

3. The method of claim 1, further comprising:
installing the new character font file in a Web Service API; and
defining the personalized handwriting character font in an Internet interface.

4. A system for dynamically generating a personalized handwriting character font, the system comprising:
an input interface for receiving a plurality of handwriting sequentially, wherein each of the handwriting describes a training character;
an identification unit for identifying positions of strokes of the training characters in the input interface described by the plurality of handwriting;
a parsing unit for analyzing font characteristics of the training characters respectively according to the positions of strokes in the input interface, wherein the font characteristics comprise lengths of strokes, angles between the strokes, spacing distances between strokes, cross positions between strokes and connection positions between strokes, and determining a personalized handwriting character font characteristic according to the font characteristics further comprising:

averaging the lengths of strokes to get an averaged stroke length, averaging the angles between the strokes to get an averaged angle between the strokes, averaging the spacing distances between strokes to get an averaged spacing distance between strokes, averaging the cross positions between strokes to get an averaged cross position between strokes and averaging the connection positions between strokes to get an averaged connection position between strokes; and gathering the averaged stroke length, the averaged angle between the strokes, the averaged spacing distance between strokes, the averaged cross position between strokes and the averaged connection position between strokes to serve as the personalized handwriting character font characteristic; and an adjusting unit for generating a new handwriting character with a personalized character font according to the personalized handwriting character font characteristic, further comprises:

inputting a handwriting character in the input interface, wherein the handwriting character includes a plurality of handwriting strokes;

modifying the handwriting strokes only according to the personalized handwriting character font characteristic, wherein the averaged stroke length, the averaged angle between the strokes, the averaged spacing distance between strokes, the averaged cross position between strokes and the averaged connection position between strokes are used to modify lengths of the handwriting strokes, angles between the handwriting strokes, spacing distances between the handwriting strokes, cross positions between the handwriting strokes and connection positions between the handwriting strokes; and forming the new handwriting character according to the modified handwriting character.

5. The system of claim 4, wherein the input interface is a magnetic type, a capacitive type or a resistive type touch sensitive panel.

6. The system of claim 4, further comprising a memory to store the personalized handwriting character font characteristic.

7. The system of claim 4, wherein the input interface and the identification unit are disposed in a handheld device, and the parsing unit and the adjusting unit are disposed on a remote server.

8. The system of claim 4, further comprises:
the parsing unit is configured to define at least one stroke of the characters as a basic component; and
when an input character has the at least one stroke, the adjusting unit is configured to use the basic component to form the at least one stroke of the input character.

* * * * *